(12) United States Patent
Surcouf et al.

(10) Patent No.: US 10,464,669 B2
(45) Date of Patent: Nov. 5, 2019

(54) UNMANNED AERIAL VEHICLE COLLISION AVOIDANCE SYSTEM

(71) Applicant: Cisco Technology, Inc., San Jose, CA (US)

(72) Inventors: Andre Surcouf, Saint-Leu-la-Foret (FR); Pascal Thubert, La Colle-sur-Loup (FR); Joseph T. Friel, Ardmore, PA (US); Hugo Latapie, Long Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 15/192,896

(22) Filed: Jun. 24, 2016

(65) Prior Publication Data
US 2017/0372624 A1 Dec. 28, 2017

(51) Int. Cl.
*B64C 39/02* (2006.01)
*H04B 7/0413* (2017.01)
*G08G 5/04* (2006.01)
*H04W 84/12* (2009.01)

(52) U.S. Cl.
CPC .......... *B64C 39/024* (2013.01); *G08G 5/045* (2013.01); *H04B 7/0413* (2013.01); *B64C 2201/141* (2013.01); *B64C 2201/146* (2013.01); *H04W 84/12* (2013.01)

(58) Field of Classification Search
CPC ............ B64C 39/024; B64C 2201/146; B64C 2201/141; H04B 7/0413; H04W 84/12; G08G 5/045

USPC .................................................. 701/2–4, 11
See application file for complete search history.

(56) References Cited

U.S. PATENT DOCUMENTS

| 5,340,056 | A | * | 8/1994 | Guelman | F41G 7/007 |
| | | | | | 244/3.16 |
| 9,859,972 | B2 | * | 1/2018 | Jalali | H04W 84/06 |
| 10,049,587 | B2 | * | 8/2018 | Kalathil | B64C 39/024 |

(Continued)

OTHER PUBLICATIONS

Throughput Improvement of High Density Wireless Personal Area Networks; Rambabu A. Vatti; Arun N. Gaikwad; 2014 International Conference on Computational Intelligence and Communication Networks; Year: 2014; pp. 506-509.*

(Continued)

*Primary Examiner* — Cuong H Nguyen
(74) *Attorney, Agent, or Firm* — Behmke Innovation Group LLC; James Behmke; Stephen D. LeBarron (57) ABSTRACT

A system for collision avoidance includes memory storing instructions which, when executed, cause one or more processors to perform determining a direction of flight of a first drone, causing broadcasting, in the direction of flight based, a beamformed signal of beacon frames, determining a new flight direction of the same first drone, in response to the new flight direction, causing broadcasting of the beacon frames in the new flight direction, detecting second beacon frames from a second drone associated with a direction from which the second beacon frames are arriving; in response, causing the first drone to perform, without input from a pilot, one or more of a change in elevation, heading, speed, or type of operation, directed toward causing the first drone to follow a flight path that is separated from the second drone.

20 Claims, 5 Drawing Sheets

(56) References Cited

U.S. PATENT DOCUMENTS

| | | | | |
|---|---|---|---|---|
| 2010/0204867 | A1* | 8/2010 | Longstaff | G01S 13/003 |
| | | | | 701/26 |
| 2015/0120126 | A1* | 4/2015 | So | G01C 23/00 |
| | | | | 701/26 |
| 2015/0236778 | A1* | 8/2015 | Jalali | H04W 84/06 |
| | | | | 370/316 |
| 2016/0046374 | A1* | 2/2016 | Kugelmass | G05D 1/101 |
| | | | | 701/8 |
| 2016/0194079 | A1* | 7/2016 | Montreuil | B64C 39/024 |
| | | | | 701/2 |
| 2017/0187450 | A1* | 6/2017 | Jalali | H04W 84/06 |
| 2017/0219676 | A1* | 8/2017 | Tran | G01R 33/56509 |
| 2018/0005535 | A1* | 1/2018 | Kalathil | B64C 39/024 |
| 2018/0086455 | A1* | 3/2018 | Burch, V | G06K 7/1413 |
| 2018/0086456 | A1* | 3/2018 | Burch, V | G06K 7/1413 |
| 2018/0086457 | A1* | 3/2018 | Burch, V | G06K 7/1413 |
| 2018/0088578 | A1* | 3/2018 | Burch, V | G06K 7/1413 |
| 2018/0089611 | A1* | 3/2018 | Burch, V | G06K 7/1413 |
| 2018/0089622 | A1* | 3/2018 | Burch, V | G06K 7/1413 |

OTHER PUBLICATIONS

Effective data gathering protocol in WSN-UAV employing priority-based contention window adjustment scheme; Say Sotheara; Naoto Aomi; Taisuke Ando; Liu Jiang; Norio Shiratori; Shigeru Shimamoto; 2014 IEEE Globecom Workshops (GC Wkshps) Year: 2014; pp. 1475-1480.*

Airborne WiFi networks through directional antennae: An experimental study; Yixin Gu; Mi Zhou; Shengli Fu; Yan Wan; 2015 IEEE Wireless Communications and Networking Conference (WCNC);Year: 2015; pp. 1314-1319.*

Long-Range and Broadband Aerial Communication using Directional Antennas (ACDA): Design and Implementation; Jienan Chen; Junfei Xie; Yixin Gu; Songwei Li; Shengli Fu; Yan Wan; Kejie Lu; IEEE Transactions on Vehicular Technology Year: 2017, vol. PP, Issue: 99.*

Initial Access Assisted by an Auxiliary Transceiver for Millimeter-Wave Networks; Jian LuoET Al.; WSA 2017; 21th International ITG Workshop on Smart Antennas; pp. 1-6; VDE Conferences; Year: 2017.*

Dual-port Conformal PIFA Diversity Antenna for Small Cylindrical Groundplane Mounting; Roshanak Zabihi et al.; 2018 IEEE International Symposium on Antennas and Propagation & USNC/URSI National Radio Science Meeting; pp. 29-30; year 2018.*

Experimental Demonstration of Distributed Beamforming on Two Flying Mini-Drones; Junming Diao ; Maziar Hedayati ; Yunxuan Ethan Wang; 2019 United States National Committee of URSI National Radio Science Meeting (USNC-URSI NRSM), pp. 1-2, IEEE Conferences.*

Adaptive Communications with Swarm Aperture; Maziar Hedayati; Junming Diao ; Yuanxun Ethan Wang ; 2019 IEEE Radio and Wireless Symposium (RWS); pp. 1-3; year 2019.*

Adaptive wireless beamforming for swarm array; Junming Diao ; Maziar Hedayati ; Yikun Haung ; Yunxuan E. Wang; 2018 United States National Committee of URSI National Radio Science Meeting (USNC-URSI NRSM); pp. 1-2; year 2018.*

A 23-to-30GHz hybrid beamforming MIMO receiver array with closed-loop multistage front-end beamformers for full-FoV dynamic and autonomous unknown signal tracking and blocker rejection; Min-Yu Huang ; Taiyun Chi ; Fei Wang ; Tso-Wei Li ; Hua Wang; pp. 68-70; year 2018.*

Autonomous Relay for Millimeter-Wave Wireless Communications; Linghe Kong et al.; IEEE Journal on Selected Areas in Communications; pp. 2127-2136; vol. 35, issue 9; year 2017.*

21.2 A 27-to-41GHz MIMO Receiver with N-Input-N-Output Using Scalable Cascadable Autonomous Array-Based High-Order Spatial Filters for Instinctual Full-FoV Multi-Blocker/Signal Management; Min-Yu Huang ; Hua Wang; 2019 IEEE International Solid-State Circuits Conference—(ISSCC) ; pp. 346-348; year 2019.*

UABeam: UAV-Based Beamforming System Analysis with In-Field Air-to-Ground Channels; Yan Shi ; Rita Enami ; John Wensowitch; Joseph Camp; 2018 15th Annual IEEE International Conference on Sensing, Communication, and Networking (SECON); pp. 1-9; year 2018.*

A 23-to-30GHz hybrid beamforming MIMO receiver array with closed-loop multistage front-end beamformers for full-FoV dynamic and autonomous unknown signal tracking and blocker rejection; Min-Yu Huang et al.; year 68-70; year 2018.*

Lavars, Nick, 'eBumper4 sonar system can be retrofitted to popular drones to avoid collisions,' Drones; Gizmag; Mar. 12, 2015; 7 pages; http://www.gizmag.com/ebumper4-sonar-drones-crash/36530/.

* cited by examiner

UNMANNED AERIAL VEHICLE COLLISION AVOIDANCE SYSTEM

TECHNICAL FIELD

The present disclosure generally relates to improved methods, computer software and/or computer hardware in the field of unmanned aerial vehicle (UAV) apparatus or drones. The disclosure relates more specifically to improved computer-implemented methods for detecting and avoiding collisions among drones.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Drones are becoming ever more popular. Hobbyist pilots may be found flying drones in backyards, parks, and other places. Commercial uses for drones are also being explored. In high density areas, where multiple drones may be flying and/or sharing the same airspace, collisions are becoming more common. Collisions may occur due to pilot error, poor visibility, or many other reasons. Since drones are costly devices, and collisions typically cause significant damage, and may even pose danger to those nearby, improved methods of collision detection and avoidance are needed.

SUMMARY

The appended claims may serve as a summary of the invention.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. OVERVIEW
2. EXAMPLE SYSTEM IMPLEMENTATION
3. FIRST FUNCTIONAL EXAMPLE
4. SECOND FUNCTIONAL EXAMPLE
5. IMPLEMENTATION EXAMPLE
6. HARDWARE OVERVIEW

1. Overview

Computer-implemented techniques are provided for detecting and avoiding collisions between drones. In one embodiment, using a computer, application program, and radio frequency transceiver, digital beacon frames are broadcast wirelessly in the flight direction of a first drone and, if a second drone with compatible equipment detects the beacon frames, then the second drone generates a warning that the first drone is near, and the second drone may take evasive action such as changing heading, speed, elevation or any combination of these. For purposes of this disclosure, the terms "UAV" and "drone" are considered interchangeable.

In one embodiment, a drone operated by a pilot comprises multiple-input and multiple-output (MIMO) antennas, an electronic digital memory unit and one or more digital processors that are configured to execute instructions that are stored in the memory unit and programmed to perform: determining a flight direction; broadcasting, on a radio frequency, a beamformed signal comprising a plurality of beacon frames in the flight direction; determining a new flight direction; in response to the new flight direction, changing the broadcasting of the plurality of beacon frames to the new flight direction; detecting one or more beacon frames from a second drone, wherein the one or more beacon frames arrive from a direction; in response to detecting the one or more beacon frames, performing, without input from the pilot and based on the direction, an evasive action to avoid the second drone.

Other aspects, features and embodiments will become apparent from the disclosure as a whole.

2. Example System Implementation

Figure 1:
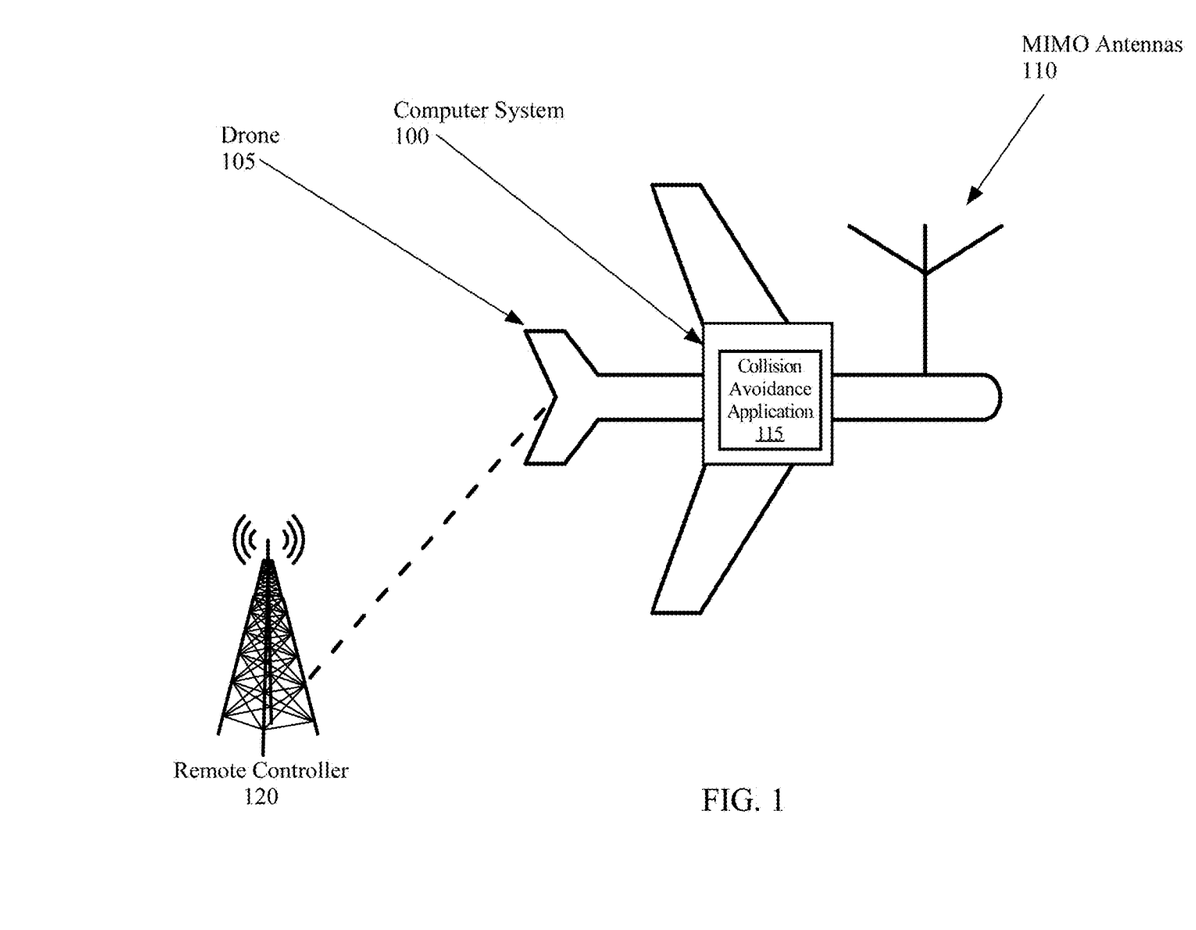
FIG. 1 shows a block diagram of a system in accordance with an embodiment of the invention.

FIG. 1 illustrates an example computer system in which the techniques described may be practiced, according to some embodiments. In one embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Computer system 100 illustrates only one of many possible arrangements of components configured to execute the programming described herein. Other arrangements may include fewer or different components, and the division of work between the components may vary depending on the arrangement.

Computer system 100 may be integrated into or hosted using a drone 105, and may be coupled to transceivers that are configured to send and receive data using multiple-input and multiple-output (MIMO) antennas 110. The computer system 100 may execute a collision avoidance application 115 that is programmed to perform the functions that are described further herein in other sections. The drone 105 may operate under control of a remote controller 120.

Drone 105 is any drone or UAV, such as a recreational drone for hobbyist use, a commercial drone for professional use, police drone, military drone, and/or a custom built drone. Drone 105 may be of any size and any type of craft, such as a helicopter, quadcopter, or plane. Drone 105 includes MIMO antennas 110 and a collision avoidance application 115.

Computer system 100 may also include many other elements that are not shown in FIG. 1, such as a central processing unit or microcontroller, a hard drive, memory, or other storage device. Drone 105 may include other elements such as engines, propellers, flight control elements, cameras, and sensing devices including, but not limited to: gyroscope, accelerometer, compass, altimeter, Global Position System (GPS) receiver, airspeed (pitot) sensor and thermometers.

In an embodiment, drone 105 is controlled by a pilot via the remote controller 120. Remote controller 120 may be a radio with input/output devices, a computer, smartphone, handheld remote control, or any other device capable of controlling a drone directly or indirectly via radio, satellite or other wireless telecommunication links. Remote controller 120 may be any distance from drone 105 that the controller supports within range of wireless or satellite communication links. For example, if remote controller 120 is a handheld remote control, then remote controller 120 may be in visual range of drone 105, so that the human pilot may see drone 105 and direct the drone appropriately. Alternatively, remote controller 120 may be miles away from drone 105. Remote controller 120 may include elements not shown in FIG. 1, such as a processor, memory, force feedback components, antennas, display, and various inputs. Remote controller 120 may send commands to, and communicate with, drone 105 using any method or frequency, such as Wi-Fi or other radio signals, or satellite signals. Optionally, in an embodiment, remote controller 120 may execute a collision avoidance application and send instructions to drone 105, instead of or in addition to the collision avoidance application executing on computer system 100. If the collision avoidance application executes on remote controller 120, additional data would be transmitted using the communication link between drone 105 and remote controller 120, and any of the functionality discussed below in regards to collision avoidance application 115 may be implemented on remote controller 120.

In an embodiment, MIMO antennas 110 comprise a three-dimensional network of antennas mounted on drone 105. MIMO antennas 110 are configured to provide transmission and receiving across a virtual sphere centered on drone 105, so that signals may be sent and/or received from all directions. In this configuration the MIMO antennas 110 are said to provide spherical coverage of the drone 105. Any number of antennas may make up MIMO antennas 110.

In an embodiment, MIMO antennas 110, in conjunction with other elements of FIG. 1, are configured to send radio signals using beamforming. Beamforming is a form of directional signal transmission. Specifically, as discussed below, MIMO antennas 110 send beacon frames using beamforming so that the beacon frames are transmitted in the direction that the drone 105 is flying at the time of the transmission. Likewise, MIMO antennas 110, in conjunction with other elements of FIG. 1, are able to receive beacon frames that were sent using beamforming from another source such as a second drone, and the direction and/or strength of the received beacon frames may be detected or otherwise determined. The antennas that make up MIMO antennas 110 may be of any type, and may be positioned on drone 105 in any suitable configuration. Any beamforming technique may be used, such as those used in 802.11ac and/or in Active Electronically Scanned Array Antennas.

In an embodiment, collision avoidance application 115 comprises program instructions that are programmed or configured to generate and broadcast beacon frames in a flight direction and to perform the other functions that are described herein in connection with certain flow diagrams.

In contrast to the methods described herein, in conventional practice, beacon frames are one of the management frames that may be used in wireless local area networks that conform to standard 802.11 of the Institute of Electrical and Electronics Engineers (IEEE). Typically beacon frames are used to periodically advertise that a wireless network is available for connection. Various information may be included in the beacon frames, such as an identifier of the network (SSID) or network setting information. Typically, an access point, or other network element, sends beacon frames at predefined intervals.

In an embodiment, unlike prior practice, the collision avoidance application 115 uses beacon frames to efficiently warn other nearby drones that drone 105 is nearby and inform the other drones of the direction from which drone 105 is coming. The beacon frames broadcast by drone 105 may be detected using compatible software and transceivers in another drone or aircraft and, in response to detection, a change in heading or elevation can be made, or evasive action can be taken before the physical mass of the drone 105 collides with the other drone or aircraft. Further, using the beacon frames, the other drone or aircraft can determine what direction and/or speed the drone 105 is traveling.

In an embodiment, collision avoidance application 115 may broadcast beacon frames periodically and any time interval may be used. The interval may change dynamically based on the speed at which drone 105 is traveling, the amount of other drones in the area, or any other suitable factor. Alternatively, collision avoidance application 115 may broadcast beacon frames at a constant interval.

The beacon frames may be broadcast using any frequency including, but not limited to: 900 MHz, 2.4 GHz, 3.6 GHz, 5 GHz, and/or 60 GHz. Any Industrial Scientific Medical (ISM) band and any communication standard may be used to broadcast beacon frames, and the invention should not be limited to the above examples. Although any 802.11 standard may be used (or other standard), 802.11ac or other more recent standards within the 802.11 family may be more suitable. Additionally, any other types of radio networks may be used to broadcast beacon frames including, but not limited to: 3G, 4G, 5G, etc.

Collision avoidance application 115 may generate beacon frames in any suitable manner. When collision avoidance application 115 generates beacon frames, custom data elements may be included in the body, or other portions of the beacon frame. For example, a field may be included to: identify the drone sending the beacon frame, indicate that the beacon frame is being used for collision detection/avoidance, provide direction, speed, height, or other data relevant to the flight direction of drone 105, identify the drone sending the beacon frame as a special type, or any other data. Optionally, data from the beacon frames may be used to establish a wireless connection between two drones and transmit additional, more detailed, data using the now-established wireless connection. Collision avoidance application 115 broadcasts the beacon frames using beamforming.

Collision avoidance application 115 and MIMO antennas 110 may perform directional signal transmission using beamforming in any manner now known or later developed. Collision avoidance application 115 uses beamforming to broadcast the beacon frames in the current flight direction of drone 105. By using beamforming when broadcasting the beacon frames, collision avoidance application 115 ensures that only other drones in or close to the current flight path of drone 105 receive the beacon frames. Thus, when another drone receives/detects beacon frames, that drone is warned of an imminent collision, and may react accordingly. Further, reflection of radio-frequency energy is not required, as with radar. Instead, the drone 105 broadcasting the beacon frames may be unaware of which, if any, drones receive the beacon frames. Collision avoidance application 115 and MIMO antennas 110 may perform beamforming using any technique.

In one embodiment, collision avoidance application 115 comprises program instructions that are programmed or configured to determine a flight direction of drone 105. Collision avoidance application 115 may determine the flight direction of drone 105 based on commands received from remote controller 120. Alternatively, collision avoidance application 115 may use input from sensors of drone 105, such as a gyroscope, accelerometer, compass, altimeter, or a GPS receiver, individually or in combination. The flight direction is constantly updated at any suitable interval. The update interval may change based on the speed, height, or other aspects of the current flight path of drone 105. Optionally, in addition to determining a flight direction, a flight speed is also determined. By also determining a speed, collision avoidance application 115 is able to detect when drone 105 is hovering.

In one embodiment, collision avoidance application 115 comprises program instructions that are programmed or configured to cease broadcasting beacon frames in response to drone 105 hovering or flying below a threshold speed. The threshold speed may be any amount, and may be set and/or adjusted by any party. By not broadcasting beacon frames when hovering or below a threshold speed, collision avoidance application 115 can reduce energy consumption and avoid needlessly warning other drones. Upon detecting that the drone 105 has begun flight again, or exceeded the speed threshold, broadcasting of beacon frames in the flight direction is resumed.

In one embodiment, collision avoidance application 115 comprises program instructions that are programmed or configured to detect beacon frames from other drones, and determine a direction that the received beacon frames arrived from. The beacon frames are received from any direction using MIMO antennas 110 to cover a spherical detection area around drone 105. Within the detection area, beacon frames from other drones are detectable. Upon receiving a beacon frame, collision avoidance application 115 determines a direction from which the beacon frame was received using any suitable method. For example, collision avoidance application 115 may use the signal strength or other factors associated with the transmission to determine a direction. Alternatively, the direction may be encoded in the beacon frames themselves. The direction may be encoded as a full 3D vector, or any other suitable format. Once a direction from which beacon frames are received is known, evasive action may be taken to avoid a collision.

In one embodiment, collision avoidance application 115 comprises program instructions that are programmed or configured to perform evasive actions. The evasive actions may be based on the direction from which beacon frames were received, current flight information of the drone receiving the beacon frames (such as altitude, speed, heading, or others), the frequency at which the beacon frames were received, information contained within the beacon frames, or any other suitable element. Although drone 105 is controlled by a human pilot, the evasive actions that collision avoidance application 115 causes drone 105 to perform are performed without human input or approval. The evasive actions taken include, but are not limited to: increasing altitude, decreasing altitude, increasing speed, decreasing speed, changing direction, hovering, a barrel roll, a split-s, or any other basic fighter maneuver, and/or any other suitable action. In crowded areas, multiple drones may be converging on the same point. Thus, while performing evasive actions, additional beacon frames from a third drone may be received, and a new evasive action taken to avoid both other drones, as needed. Additionally, beacon frames may be received from multiple sources at the same time, causing the resulting evasive maneuvers to be more elaborate to avoid multiple drones simultaneously.

In one embodiment, collision avoidance application 115 comprises program instructions that are programmed or configured to determine if the beacon frames are of a special type, and perform actions based on the special type. A special type is related to a privileged drone, such as a police or military drone, flight instructor or regulator drone, or any other special type. A special type may be indicated by the frequency used to transmit the beacon frames, by a special data field in the beacon frames, or in any other manner. In response to receiving beacon frames from a special type, the receiving drone takes specific actions. For example, if beacon frames are received from a police or military drone, the evasive action may be to hover or perform an autopilot landing of the drone. Any action may be performed in response to receiving beacon frames of a special type.

In one embodiment, collision avoidance application 115 comprises program instructions that are programmed or configured to send feedback to remote controller 120. Optionally, upon receiving beacon frames, collision avoidance application 115 may alert the human pilot to the impending collision by sending feedback to remote controller 120. The feedback may take any form. For example, force feedback may be used to allow the pilot to feel that there is an approaching drone from a given direction. Alternatively, text, sounds, colors, lights, or other notifications may be used. Further, feedback may be provided when evasive actions are performed so that the human pilot knows why his or her drone performed flight maneuvers that the human pilot did not instruct the drone to perform.

In one embodiment, a fixed object (not shown) may emit beacon frames, as discussed above, to ensure that drones do not hit the fixed object, or to create a "no fly zone" around the object. For example, a building may include one or more radio towers that broadcast beacon frames in all directions around the building. Any drones receiving these beacon frames would perform evasive actions to avoid the building. The beacon frames emitted by a fixed object may include additional data that, for example, identifies a size of a no fly zone around the fixed object, such as a cylindrical no fly zone extending around a fixed object with a radius of 300 feet, and a height of 500 feet. Any information related to avoiding a fixed object may be included in the beacon frames sent by a fixed object.

3. First Functional Example

Figure 2:
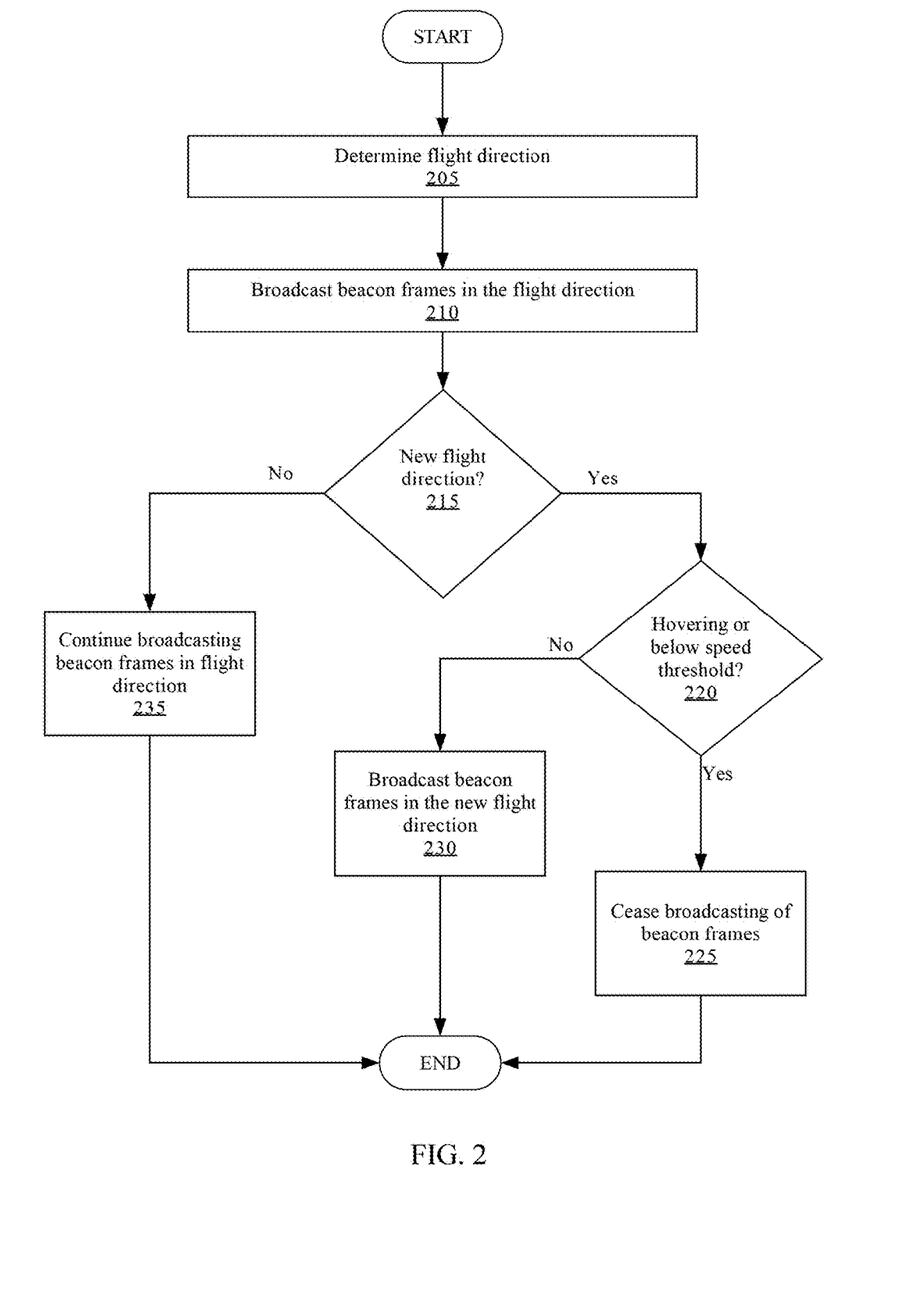
FIG. 2 shows a flowchart of a method in accordance with an embodiment of the invention.

FIG. 2 shows an example flowchart of a method for drone collision detection and avoidance. Specifically, FIG. 2 shows an example flowchart for sending beacon frames in a current flight path of a drone. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 205, a flight direction is determined. The flight direction may be determined based on commands received from the pilot. Alternatively, or in addition, the flight direction may be determined based on sensors on the drone, such as a gyroscope, accelerometer, compass, altimeter, GPS receiver, etc. Although shown as a single step, step 205 is performed continuously while the drone is in flight. Step 205 may be performed at any interval, and the interval may change dynamically based on the determined flight direction, speed, height, how crowded the airspace is, or any other factor.

In step 210, beacon frames are generated and broadcast in the flight direction. The beacon frames may be generated in any manner, and may contain data related to the drone broadcasting the beacon frames, such as an identifier, flight direction information, or other data. Specifically, the beacon frames are broadcast in the flight direction using beamforming, so that only other drones in or near the current flight direction of the drone are warned of a potential collision. The beamforming may be performed in any manner now known or later developed. The beacon frames may be broadcast using any suitable frequency, such as 2.4 GHz, and any suitable wireless standard. Although the 802.11 wireless networking standard is discussed above, other standards may also be used to implement the invention. No response is needed or expected to the beacon frames, as the beacon frames are broadcast as a warning to other drones that a drone is coming in the same direction as the beacon frames.

In step 215, a determination is made whether there is a new flight direction. The determination may be made in the same manner as step 205. Further, as discussed in step 205, determining a flight direction and/or if there is a new flight direction, is a continuous process while the drone is in flight. If there is not a new flight direction, the method proceeds to step 235. If there is a new flight direction, the method proceeds to step 220.

In step 220, a determination is made whether the new flight direction is hovering or below a speed threshold. The speed threshold may be set to any suitable speed, and may be adjusted dynamically based on any suitable factors. If the new flight direction is not hovering and/or is above the speed threshold, the method proceeds to step 230. If the new flight direction is hovering or is below the speed threshold, the method proceeds to step 225.

In step 225, broadcasting of beacon frames is ceased. The broadcasting of beacon frames is ceased in response to the drone either hovering or moving below a speed threshold. By not broadcasting beacon frames when hovering or moving slowly, less energy is consumed, and other drones are not unnecessarily warned. However, even if broadcasting of beacon frames has stopped, the drone still listens for beacon frames from other drones, as the drone may still need to avoid collisions, even when hovering.

In step 230, beacon frames are broadcast in the new flight direction. The beacon frames are broadcast in the new flight direction using beamforming, as discussed in step 210. Optionally, the beacon frames may be broadcast at a shorter or longer interval than in the previous direction if, for example, the new flight direction was faster or slower, respectively, than the previous flight direction. Further, the frequency or any other factor related to the broadcast may also change in addition to the direction of the broadcast.

In step 235, broadcasting of beacon frames in the flight direction continues. If the flight path has not changed, the beacon frames are continuously broadcast in the flight direction to continue warning other drones of potential collisions.

4. Second Functional Example

Figure 3:
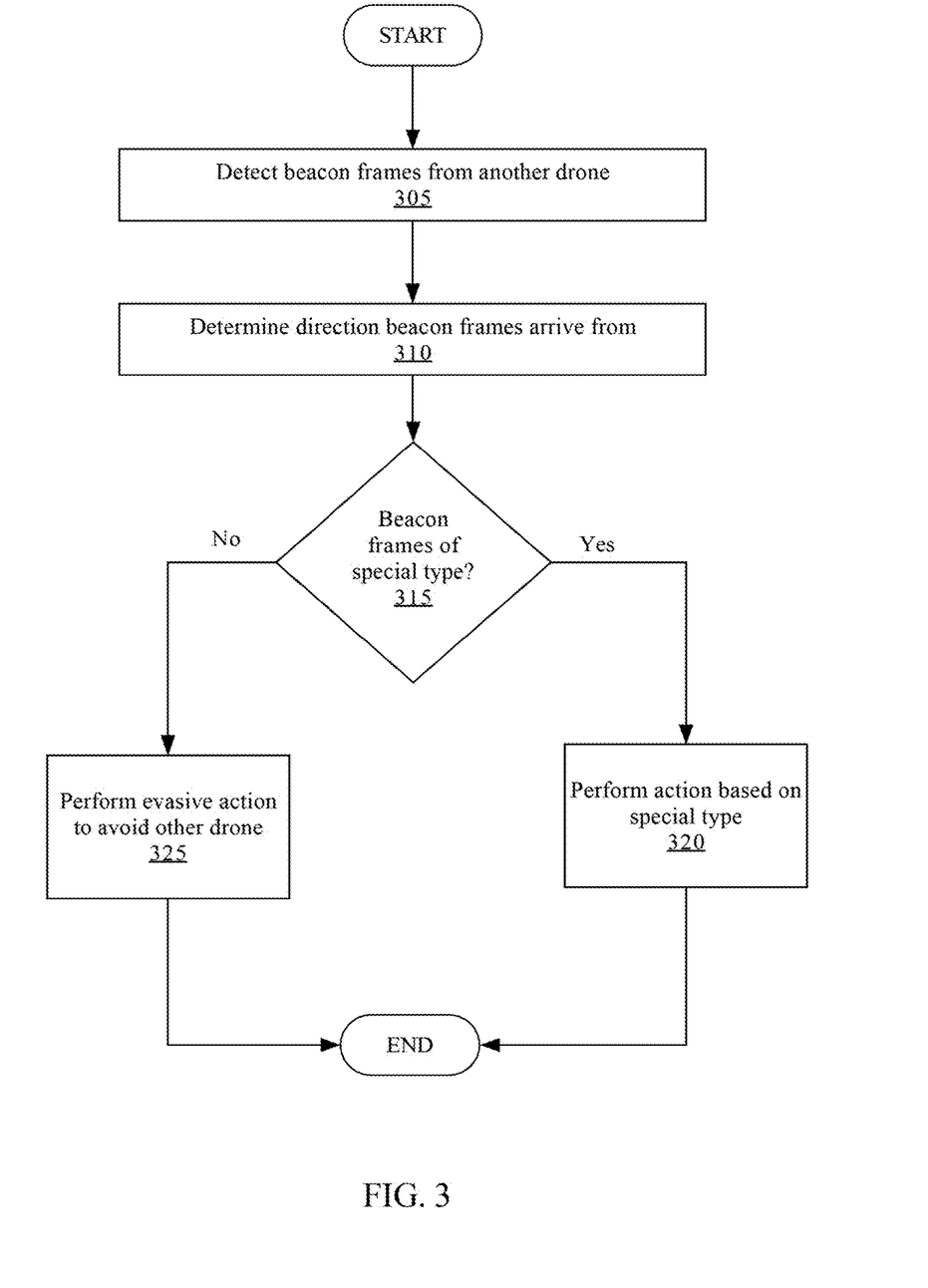
FIG. 3 shows a flowchart of a method in accordance with an embodiment of the invention.

FIG. 3 shows an example flowchart of a method for drone collision detection and avoidance. Specifically, FIG. 3 shows an example flowchart for receiving beacon frames and performing evasive action(s). Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

In step 305, beacon frames are detected from another drone. The beacon frames may be detected in any manner. Specifically, due to having MIMO antennas, each drone has a spherical detection area surrounding the drone in which beacon frames are able to be detected/received. Any number of beacon frames may be received from any number of drones. Potentially, in crowded airspace a drone may be on a collision course with multiple other drones simultaneously.

In step 310, a direction from which the beacon frames arrived is determined. The direction may be determined in any manner. Specifically, the signal strength or other transmission attributes may be used to determine the direction. Alternatively, or in addition, data within the beacon frames may be used to determine the direction. Optionally, in response to detecting beacon frames and determining a direction from which the beacon frames arrived, feedback may be provided to the pilot. The feedback may take any form, such as force feedback, sounds, colors, or other notifications, etc.

In step 315, a determination is made whether the beacon frames are of a special type. A special type of beacon frame may indicate that a police, military, or other privileged drone is sending the beacon frames, and that special actions should be performed in response to detecting/receiving the beacon frames. If the beacon frames are not of a special type, the method proceeds to step 325. If the beacon frames are of a special type, the method proceeds to step 320.

In step 320, an action(s) is performed based on the special type. Each special type may have a specific action associated with it. For example, if the special type is a police drone, the action may be to stop flying and hover. Alternatively, if the special type is a military drone, the special action may be to disable pilot input and perform an auto-pilot landing. Further, other data may be taken into consideration when performing the action, such as the direction from which the beacon frames were received, or an altitude of the drone. Any action may be performed for any type, and the invention should not be limited to the above examples. Further, the action is performed without input from the human pilot. Optionally, feedback may be sent to the pilot to alert them to the actions performed. For example, a sound or text notification may be sent to the pilot if a police drone has been detected, informing the pilot that he or she has been "pulled over." While the action is performed, the drone may still monitor for beacon frames from other drones.

In step 325, an evasive action(s) is performed to avoid the other drone. The evasive action may be based on any available information such as a current altitude, speed, and/or direction of the drone, and/or on available information about the approaching drone, such as direction and/or speed. The evasive action may be any action including, but not limited to: speeding up or slowing down, increasing or decreasing altitude, any basic fighter maneuver, and/or changing direction. While performing the evasive action, the drone still monitors for beacon frames from other drones. In the event that beacon frames are received from a new drone during the evasive action, the evasive action may be changed to avoid both drones, as needed. Further, the action is performed without input from the human pilot. Optionally, feedback may be sent to the pilot to alert them to the actions performed, such as an alert or notification.

5. Implementation Example

Figure 4:
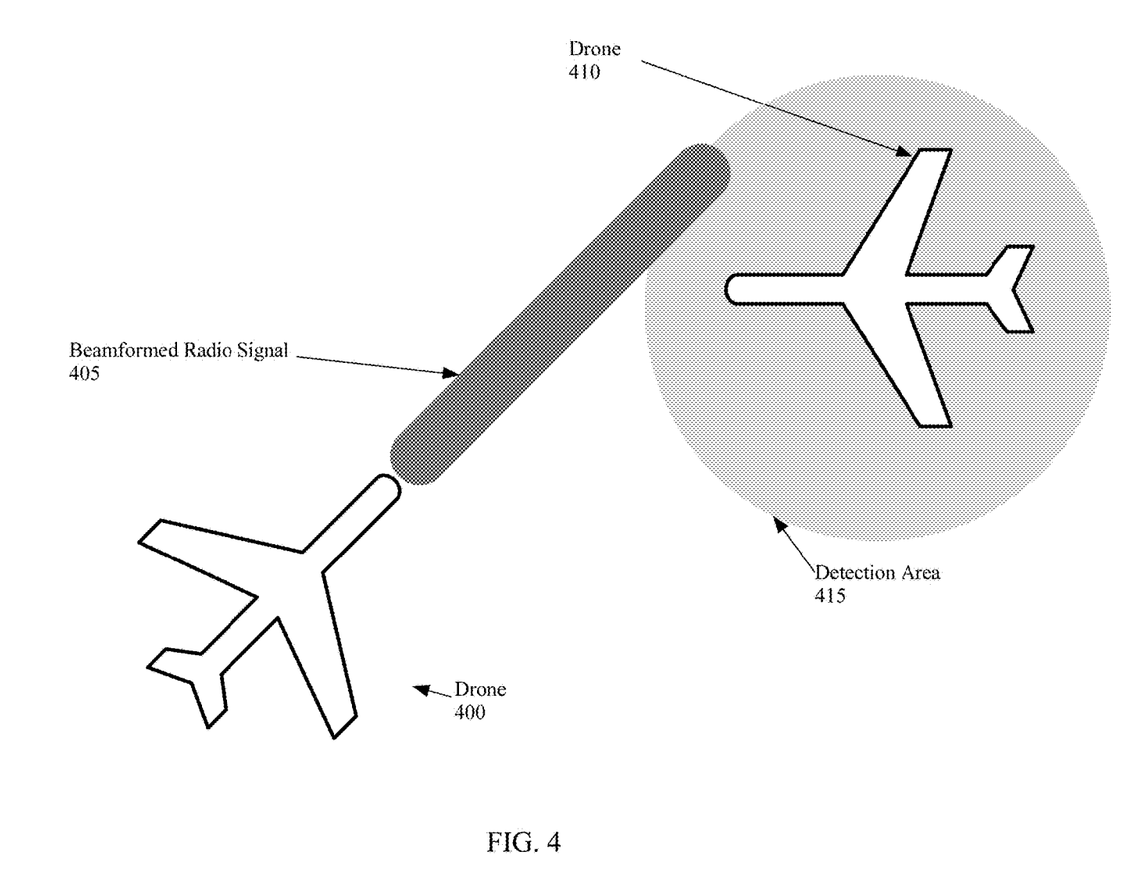
FIG. 4 shows an example in accordance with an embodiment of the invention.

FIG. 4 shows an example use case for drone collision detection and avoidance. The example shown in FIG. 4 has been greatly simplified, to ease understanding and, as such, the example should not be construed to limit the disclosure to the specifics discussed below.

Turning to the example, FIG. 4 shows two drones on a potential collision course, a first drone 400 and a second drone 410. Drone 400 is broadcasting a beamformed radio signal 405. The beamformed radio signal 405 contains beacon frames that are used to alert drone 410 to the impending collision. When beacon frames from beamformed radio signal 405 enter the detection area 415 of drone 410, the second drone is alerted to the presence of first drone 400, and that there is an imminent potential collision. Detection area 415 is a spherical space around drone 410 in which that drone is able to detect/receive radio signals, such as beacon frames. Drone 410 is able to determine the direction from which the beacon frames have been received using signal strength or any other method. And, because the beacon frames were sent using beamforming, drone 410 therefore knows the direction in which drone 400 is approaching. Accordingly, drone 410 is able to take evasive action by increasing flight altitude, and avoid the collision with drone 400.

Although not shown in FIG. 4, drone 400 has a spherical detection area similar to detection area 415, so that drone 400 can detect beacon frames from approaching drones and take evasive action as needed. Likewise, although not shown in FIG. 4, drone 410 also broadcasts a beamformed radio signal containing beacon frames to alert other drones that drone 410 is approaching. As discussed above, the invention functions similar to headlights on a car. Other drones are able to "see" where a drone is headed, and the other drones must take evasive action to avoid a collision. Simultaneously, the other drones are also broadcasting where they are going so that still other drones may avoid them.

This invention has many advantages over other methods of drone collision detection and avoidance. One advantage, is that the present invention operates using standard equipment on drones—the ability to send and receive wireless signals, such as Wi-Fi, although other signal types may be used. No complicated or energy consuming radar or other methods are used. Further, the present invention does not require the drone sending signals to know where other drones are, or to receive any data from other drones. Rather, the impetus is on any drones receiving a signal to move out of the way of a potential collision. This results in a fast and efficient method for drone collision detection and avoidance. Optionally, a connection may be established between nearby drones to exchange data. Additionally, because signals are only sent in the flight direction of drones, less energy is used than if signals needed to be broadcast in all directions. Additional energy savings may be had by ceasing broadcasting of beacon frames when the drone is hovering or moving slowly.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
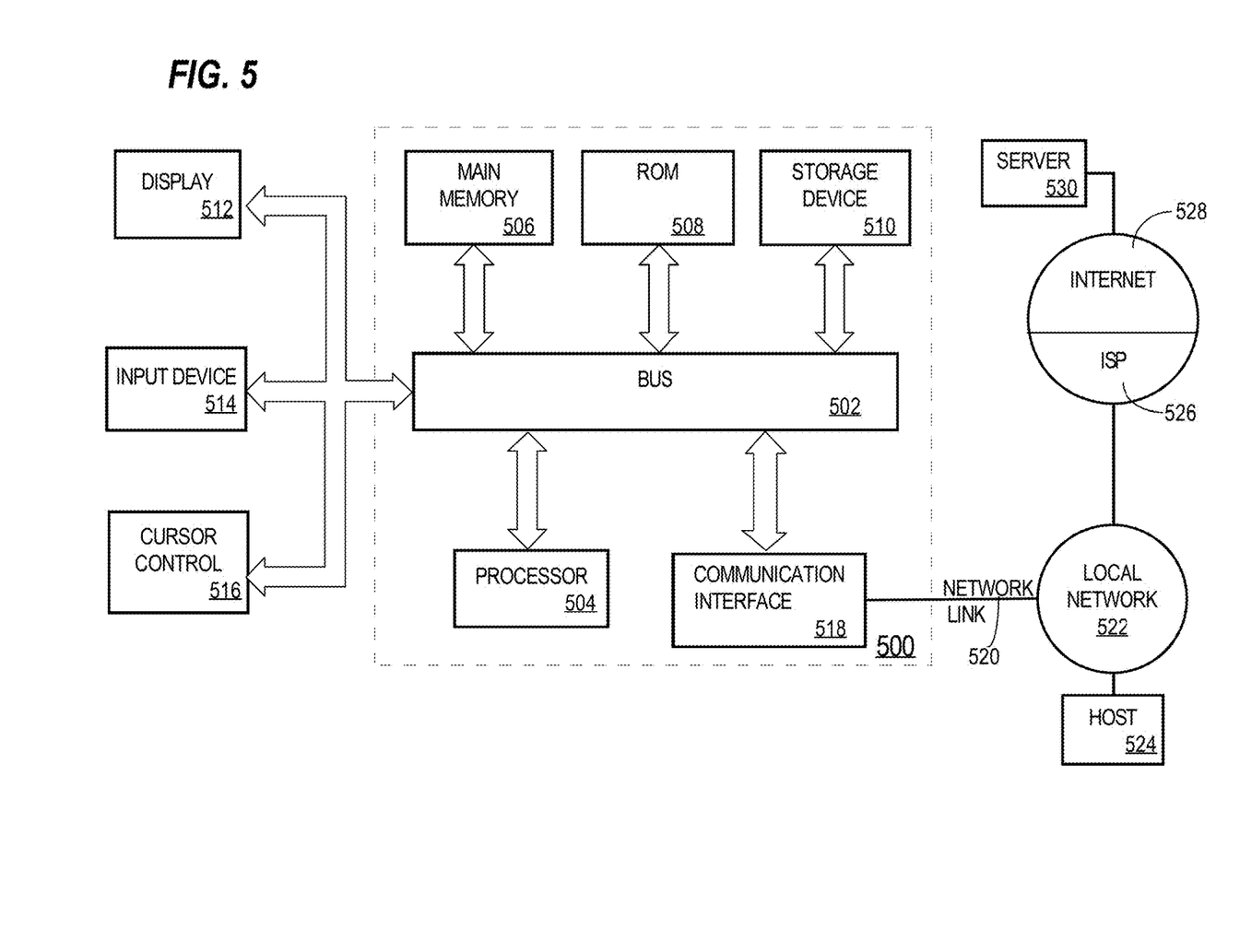
FIG. 5 shows a block diagram of a computer system with which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Extensions and Alternatives

The process described herein of determining flow length characteristics using a network infrastructure device, and the process of using a collector device to analyze the flow length characteristics and take responsive action, may be implemented independently or in combination. For example, when an independent approach is used, the collector device may be programmed to perform: receiving, at the collector device, a first length of a first datagram, a second length of a second datagram, and a duration between a first arrival of the first datagram and a second arrival of the second datagram; determining, using the first length, second length, and duration, an application associated with the first datagram and the second datagram; in response to determining that the application is a known malicious application, sending an alert; wherein the method is executed by one or more computing devices. In one approach, determining the application further comprises using a trained classifier, wherein the trained classifier is trained on training data from a software application reporting a name and a hash for the software application associated with a flow. The collector device may be programmed for accessing a file reputation service determine a reputation of the application. In some embodiments the application is a client application. In one approach, determining the application is performed in retrospect to detect a malicious application that was unknown when the first length, the second length, and the duration were received.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
a first drone comprising:
multiple-input and multiple-output (MIMO) antennas;
one or more processors;
an electronic digital memory storing one or more sequences of instructions which, when executed by the one or more processors, cause the one or more processors to perform:
determining a current flight direction value associated with a direction of flight of the first drone while the first drone is in flight;
causing broadcasting, on a radio frequency and in the direction of flight based on the current flight direction value, a beamformed signal comprising a plurality of first beacon frames;

determining, while the first drone is in flight, a new flight direction value of the same first drone and associated with a new direction of flight of the first drone;

in response to the new flight direction value, causing broadcasting of the plurality of first beacon frames using the new flight direction based on the new flight direction value;

detecting one or more second beacon frames from a second drone associated with a second direction from which the one or more second beacon frames are arriving;

establishing, using data from the one or more second beacon frames, a wireless connection between the first drone and the second drone;

receiving, from the second drone, over the wireless connection, flight data associated with the second drone, wherein the flight data comprises a second direction value corresponding to the second direction;

in response to receiving flight data associated with the second drone, causing the first drone to perform, without input from a pilot of the first drone, and based on the second direction value, one or more of a change in elevation, heading, speed, or type of operation, directed toward causing the first drone to follow a flight path that is separated from the second drone.

2. The system of claim 1, wherein each of the plurality of first beacon frames comprises an identifier for the first drone.

3. The system of claim 1, wherein the radio frequency is an Industrial Scientific Medical (ISM) band.

4. The system of claim 3, wherein the ISM band is 802.11 for wireless networking.

5. The system of claim 1, further comprising instructions which when executed by the one or more processors cause ceasing broadcasting the plurality of first beacon frames when the new flight direction is stationary or below a threshold speed.

6. The system of claim 1, wherein the one or more second beacon frames indicate the second drone is of a special type; further comprising instructions which when executed by the one or more processors cause performing the one or more of the change in elevation, heading and type of operation based on the special type.

7. The system of claim 6, further comprising instructions which when executed by the one or more processors cause the first drone to hover.

8. The system of claim 1, further comprising instructions which when executed by the one or more processors cause:

detecting one or more third beacon frames from a third drone, and a third direction value associated with a third direction from which the one or more third beacon frames are arriving;

in response to detecting the one or more second beacon frames and the one or more third beacon frames, causing the first drone to perform, without input from a pilot of the first drone, and based on the second direction value and the third direction value, one or more of a change in elevation, heading or type of operation, directed toward causing the first drone to follow a flight path that is separated from the second drone and the third drone.

9. The system of claim 1, further comprising instructions which when executed by the one or more processors cause, in response to detecting the one or more beacon frames from the second drone, sending feedback to the pilot of the first drone.

10. The system of claim 1, further comprising instructions which when executed by the one or more processors cause:

receiving, from the second drone, information regarding a no-fly zone in a radius around the second drone;

wherein causing the first drone to perform, without input from a pilot of the first drone, and based on the second direction value, one or more of a change in elevation, heading, speed, or type of operation comprises causing the first drone to perform, without input from a pilot of the first drone, and based on the second direction value, one or more of a change in elevation, heading, speed, or type of operation, directed toward causing the first drone to follow a flight path that is separated from the no-fly zone of the second drone.

11. The system of claim 1 comprising a computer in the first drone.

12. A method comprising:

determining, by a first drone using a computer processor and multiple-input and multiple-output (MIMO) antennas, a current flight direction value associated with a direction of flight of the drone;

causing broadcasting, using the computer processor on a radio frequency and in the direction of flight based on the flight direction value, a beamformed signal comprising a plurality of beacon frames;

determining, using the computer processor while the drone is in flight, a new flight direction value of the drone and associated with a new direction of flight of the drone;

in response to the new flight direction value, causing broadcasting of the plurality of beacon frames using the new flight direction based on the new flight direction value;

detecting one or more second beacon frames from a second drone associated with a second direction from which the one or more second beacon frames are arriving;

establishing, using data from the one or more second beacon frames, a wireless connection between the first drone and the second drone;

receiving, from the second drone, over the wireless connection, flight data associated with the second drone, wherein the flight data comprises a second direction value corresponding to the second direction.

13. The method of claim 12, wherein each of the plurality of beacon frames comprises an identifier for the drone.

14. The method of claim 12, wherein the radio frequency is an Industrial Scientific Medical (ISM) band, and wherein the ISM band is 802.11 for wireless networking.

15. The method of claim 12, further comprising:

ceasing broadcasting the plurality of beacon frames when the new flight direction is stationary or below a threshold speed.

16. A method comprising:

detecting, by a first drone using a computer processor and multiple-input and multiple-output (MIMO) antennas, while the first drone is in flight, one or more beacon frames from a second drone associated with a direction from which the one or more beacon frames are arriving;

establishing, using data from the one or more second beacon frames, a wireless connection between the first drone and the second drone;

receiving, from the second drone, over the wireless connection, flight data associated with the second drone, wherein the flight data comprises a second direction value corresponding to the second direction;

in response to receiving flight data associated with the second drone, causing the first drone to perform, without input from a pilot of the first drone, and based on the direction value, one or more of a change in elevation, heading, speed, or type of operation, directed toward causing the first drone to follow a flight path that is separated from the second drone.

17. The method of claim 16, wherein the one or more beacon frames indicate the second drone is of a special type; and further comprising:
performing the one or more of the change in elevation, heading and type of operation based on the special type.

18. The method of claim 16, further comprising causing the first drone to hover.

19. The method of claim 16, further comprising: in response to detecting the one or more beacon frames from the second drone, sending feedback to the pilot of the first drone.

20. The system of claim 6, wherein:
the second beacon frames indicate the special type is a military or police drone;
performing the one or more of the change in elevation, heading and type of operation based on the special type is performed in response to determining the second beacon frames indicate the special type is a military or police drone;
performing the one or more of the change in elevation, heading and type of operation based on the special type comprises, without input from the pilot of the first drone, disabling pilot input and performing an autopilot landing of the first drone.

* * * * *